United States Patent
Sonoda

(10) Patent No.: US 7,488,118 B2
(45) Date of Patent: Feb. 10, 2009

(54) OPTICAL COUPLING ELEMENT AND OPTICAL COUPLING UNIT

(75) Inventor: Katsunari Sonoda, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 12/052,604

(22) Filed: Mar. 20, 2008

(65) Prior Publication Data

US 2008/0285918 A1  Nov. 20, 2008

(30) Foreign Application Priority Data

May 14, 2007 (JP) ............................. 2007-127575

(51) Int. Cl.
  *G02B 6/36* (2006.01)
(52) U.S. Cl. .............................. 385/88; 385/92; 385/93
(58) Field of Classification Search .................... 385/88, 385/92–93

See application file for complete search history.

(56) References Cited

U.S. PATENT DOCUMENTS 5,526,455 A  6/1996  Akita et al.
5,675,683 A  10/1997  Takahashi et al.
6,779,929 B1 *  8/2004  Savage, Jr. .................... 385/92

FOREIGN PATENT DOCUMENTS

JP  7-134225  5/1995

* cited by examiner

*Primary Examiner*—Ellen Kim
(74) *Attorney, Agent, or Firm*—Beyer Law Group LLP

(57) ABSTRACT

An optical coupling element disposed between an optical fiber and an optical element that face each other and optically coupling these two facing components includes a substantially cylindrical optical coupling portion whose opposite end surfaces respectively face the optical fiber and the optical element; and a projection projecting radially from a periphery of the optical coupling portion and being located closer towards one of the opposite end surfaces with respect to a center position therebetween. A diameter of the optical coupling portion at a position corresponding to a first end surface of the projection is substantially equal to a diameter of the optical coupling portion at a position corresponding to a second end surface of the projection. The periphery of the optical coupling portion includes periphery surfaces tapered from the positions corresponding to the first and second end surfaces of the projection respectively towards the opposite end surfaces.

10 Claims, 2 Drawing Sheets

OPTICAL COUPLING ELEMENT AND OPTICAL COUPLING UNIT

CLAIM OF PRIORITY

This application claims benefit of the Japanese Patent Application No. 2007-127575 filed on May 14, 2007, which is hereby incorporated by reference.

BACKGROUND OF THE INVENTION

1. Field of the Invention

The present invention relates to optical coupling elements disposed between an optical fiber and an optical element so as to optically couple the optical fiber and the optical element, and to optical coupling units equipped with such optical coupling elements. In particular, the present invention relates to an optical coupling element and an optical coupling unit in which an optical coupling portion is free of a multilayer structure.

2. Description of the Related Art

Optical coupling elements that optically couple an optical fiber and an optical element, such as a light-emitting element or a light-receiving element, have been known. In addition, optical coupling units that include such an optical coupling element and a holding member that holds the optical coupling element and the optical fiber have also been known. An optical coupling element is capable of coupling light from the optical fiber to the optical element or light from the optical element to the optical fiber at high efficiency. An example of an optical coupling unit configured to have a lens disposed between an optical fiber and an optical element for the purpose of optical coupling is disclosed in Japanese Unexamined Patent Application Publication No. 7-134225.

Another known example of an optical coupling element only has an optical coupling function and is separately provided with a component such as a lens. In this case, the optical coupling element can have a simple cylindrical shape, but will require a multilayer structure including two layers which are a core layer and a cladding layer if bidirectional light transmission is desired.

However, since optical coupling elements having such structures are formed by joining together two different components, such optical coupling elements are problematic in view of high costs. On the other hand, if an optical coupling element is to be formed by resin molding, it is difficult to perform the molding process stably since the optical coupling element has a linear form.

SUMMARY OF THE INVENTION

The present invention provides an optical coupling element that is constituted by a single component and can be formed readily by molding, and an optical coupling unit equipped with such an optical coupling element.

An optical coupling element according to the present invention is disposed between an optical fiber and an optical element that face each other and optically couples the optical fiber and the optical element. The optical coupling element includes a substantially cylindrical optical coupling portion whose opposite end surfaces respectively face the optical fiber and the optical element; and a projection projecting from a periphery of the optical coupling portion in a radial direction, the projection being located closer towards one of the opposite end surfaces with respect to a center position between the opposite end surfaces. A diameter of the optical coupling portion at a position corresponding to a first end surface of the projection is substantially equal to a diameter of the optical coupling portion at a position corresponding to a second end surface of the projection. The periphery of the optical coupling portion includes periphery surfaces that are tapered from the positions corresponding to the first and second end surfaces of the projection respectively towards the opposite end surfaces of the optical coupling portion. Accordingly, the optical coupling element can allow for light propagation without requiring a multilayer structure, and the amount of light loss caused by the projection required for fixation purpose can be minimized. In addition, since the optical coupling portion has tapered periphery surfaces, the optical coupling element can have good mold release properties at the time of the molding process, thereby facilitating the molding process.

In the optical coupling element according to the present invention, the optical coupling portion and the projection are preferably formed from a single resin material. Accordingly, the optical coupling element can be manufactured readily at low cost.

In the optical coupling element according to the present invention, the optical coupling portion is preferably configured such that one of the periphery surfaces that extends from the position corresponding to the first end surface of the projection to one of the opposite end surfaces of the optical coupling portion and the other periphery surface that extends from the position corresponding to the second end surface of the projection to the other one of the opposite end surfaces of the optical coupling portion have different lengths in an optical-axis direction. In this case, the periphery surface that is shorter than the other periphery surface in the optical-axis direction is preferably tapered to have an inclination angle greater than that of the other periphery surface that is longer in the optical-axis direction. This makes it extremely easy to release a mold at the side of one of the periphery surfaces at the time of the molding process. Accordingly, one mold can be released naturally while the other can be released using an extrusion pin provided on the mold. Using such a method, the releasing of the two molds can be ensured.

In the optical coupling element according to the present invention, the projection preferably includes a flange portion having a brim-like shape that projects from and extends around the periphery of the optical coupling portion, and a cylindrical portion having a periphery that extends from an edge of the flange portion in a direction orthogonal to the radial direction of the flange portion. Accordingly, the optical coupling element can be properly positioned and held by utilizing the periphery and an end surface of the cylindrical portion.

In the optical coupling element according to the present invention, the projection may include a fin projecting from the periphery of the optical coupling portion. Accordingly, the optical coupling element can be properly positioned and held by utilizing the fin.

In the optical coupling element according to the present invention, the fin serving as the projection may include a plurality of fins arranged along the periphery of the optical coupling portion in a circumferential direction thereof. Accordingly, the optical coupling element can be held properly with respect to the circumferential direction of the optical coupling portion.

An optical coupling unit according an aspect of the present invention includes the aforementioned optical coupling element and a holding member for securing the optical coupling element and the optical fiber. The holding member has a coupling-element holding portion having an internal shape that substantially corresponds to an external shape of the cylindrical portion of the projection, and an inner wall having an inner periphery surface that faces the periphery of the optical coupling portion while being spaced apart from the periphery of the optical coupling portion. Accordingly, the optical coupling element having the projection constituted by the flange portion and the cylindrical portion can be properly held by the holding member, and an air gap can be provided between the optical coupling portion and the inner wall, thereby allowing for light propagation with a single component.

An optical coupling unit according another aspect of the present invention includes the aforementioned optical coupling element and a holding member for securing the optical coupling element and the optical fiber. In this aspect, the holding member has a groove for holding the fin, and an inner wall having an inner periphery surface that faces the periphery of the optical coupling portion while being spaced apart from the periphery of the optical coupling portion. Accordingly, the optical coupling element having the projection constituted by the fin can be properly held by the holding member, and an air gap can be provided between the optical coupling portion and the inner wall, thereby allowing for light propagation with a single component.

DESCRIPTION OF THE PREFERRED EMBODIMENTS

Figure 1:
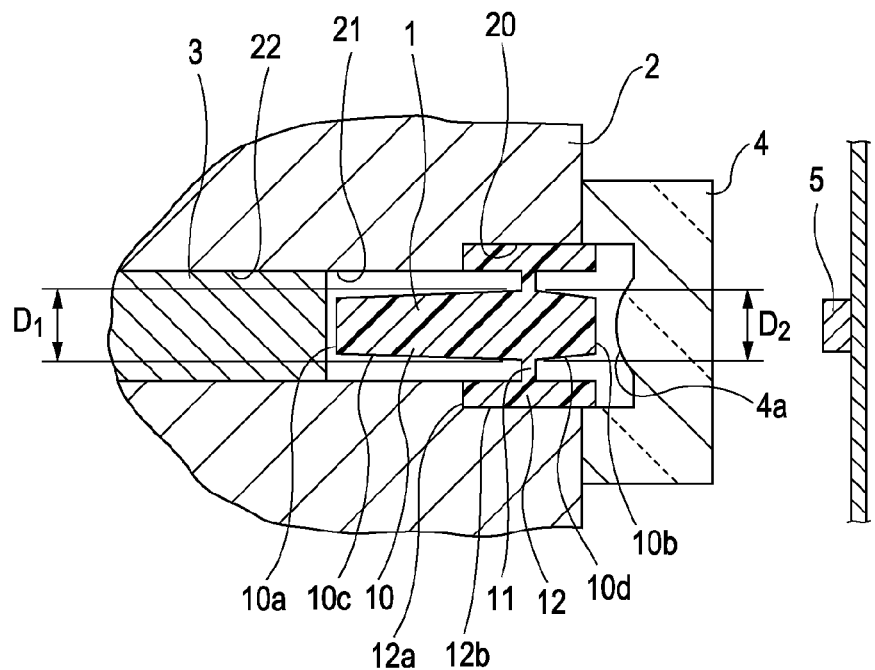
FIG. 1 is a cross-sectional view of an optical coupling unit according to a first embodiment.

Embodiments of the present invention will now be described in detail with reference to the drawings. A first embodiment of the present invention will be described first. FIG. 1 is a cross-sectional view of an optical coupling unit according to the first embodiment. As shown in FIG. 1, the optical coupling unit according to the first embodiment includes an optical coupling element 1 that is held by a holding member 2, a lens member 4 having a lens portion 4a and fixed to a first end of the optical coupling element 1, an optical fiber 3 disposed adjacent to a second end of the optical coupling element 1, and a light emitting/receiving portion 5 disposed facing the first end of the optical coupling element 1 across the lens portion 4a.

The optical coupling element 1 is formed integrally using a single resin material. The optical coupling element 1 is disposed between the optical fiber 3 and the light emitting/receiving portion 5, and has a function for optically coupling these two components. Specifically, the optical coupling element 1 is capable of optically coupling light from the optical fiber 3 to the light emitting/receiving portion 5 at high efficiency as well as optically coupling light from the light emitting/receiving portion 5 to the optical fiber 3 at high efficiency. To achieve this function, the optical coupling element 1 has a substantially cylindrical optical coupling portion 10, and is also integrally provided with a flange portion 11 and a cylindrical portion 12 together serving as a projection used for fixing the optical coupling portion 10 to the holding member 2.

On the other hand, the holding member 2 has an inner wall 21 having an inner periphery surface that faces periphery surfaces 10c and 10d of the optical coupling portion 10 while being spaced apart from the periphery surfaces 10c and 10d. In other words, the periphery surfaces 10c and 10d of the optical coupling portion 10 and the holding member 2 have an air gap therebetween that has a refractive index different from that of the resin material constituting the optical coupling portion 10. This allows for light propagation between the optical fiber 3 and the light emitting/receiving portion 5. The optical fiber 3 is securely held by a fiber holding portion 22 of the holding member 2.

With respect to a center position between an end surface 10a of the optical coupling portion 10 facing the optical fiber 3 and an end surface 10b of the optical coupling portion 10 facing the light emitting/receiving portion 5, the flange portion 11 is located at a position closer towards the end surface 10b facing the light emitting/receiving portion 5. The flange portion 11 has a brim-like shape that projects radially from and extends around the periphery of the optical coupling portion 10. The periphery surface 10c of the optical coupling portion 10 extends between the surface of the flange portion 11 facing the optical fiber 3 and the end surface 10a of the optical coupling portion 10, and tapers from the flange portion 11 towards the end surface 10a. The periphery surface 10d of the optical coupling portion 10 extends between the surface of the flange portion 11 facing the light emitting/receiving portion 5 and the end surface 10b of the optical coupling portion 10, and similarly tapers from the flange portion 11 towards the end surface 10b.

The periphery surface 10c of the optical coupling portion 10 has a diameter $D_1$ at the position of an end surface of the flange portion 11 facing the optical fiber 3. The periphery surface 10d of the optical coupling portion 10 has a diameter $D_2$ at the position of an end surface of the flange portion 11 facing the light emitting/receiving portion 5. The two diameters $D_1$ and $D_2$ are equal to each other. With this configuration, the amount of loss of light passing through the optical coupling portion 10 can be minimized even if the optical coupling portion 10 has the flange portion 11 projecting outward therefrom in the radial direction, thereby enhancing the coupling efficiency between the optical fiber 3 and the light emitting/receiving portion 5. It is to be noted that the diameters $D_1$ and $D_2$ do not necessarily have to be exactly equal to each other, and that the amount of light loss can be satisfactorily minimized as long as the two diameters $D_1$ and $D_2$ are of similar values.

Because the periphery surfaces 10c and 10d of the optical coupling portion 10 are tapered respectively towards the end surfaces 10a and 10b, the optical coupling element 1 can have good mold release properties after being molded out of a resin material. To describe the molding process in detail, two molds facing each other in the optical-axis direction of an optical coupling portion 10 are first prepared. The two molds are then joined together at a position corresponding to a flange portion 11. After the optical coupling portion 10 is molded, the two molds are released by moving them away from each other respectively towards the end surfaces 10a and 10b.

As mentioned above, with respect to a center position between the end surfaces 10a and 10b of the optical coupling element 1, the flange portion 11 is formed so as to be located at a position closer towards the end surface 10b. Therefore, the periphery surface 10d being shorter in the optical-axis direction can be tapered to have an inclination angle greater than that of the tapered periphery surface 10c that is longer in the optical-axis direction. This makes it extremely easy to release the mold at the side of the periphery surface 10d. Accordingly, when the two molds are to be moved away from each other after the molding process, one mold can be released naturally while the other can be released using an extrusion pin provided on the mold. Using such a method, the releasing of the two molds can be ensured.

The cylindrical portion 12 constituting a projection has an outer periphery 12b that extends from the edge of the flange portion 11 in a direction parallel to the optical-axis direction of the optical coupling portion 10, which is orthogonal to the radial direction of the flange portion 11. On the other hand, the holding member 2 has an opening at the side thereof facing the light emitting/receiving portion 5. This opening defines a coupling-element holding portion 20 having an inside diameter substantially equal to the diameter of the outer periphery 12b of the cylindrical portion 12. The cylindrical portion 12 is inserted in the coupling-element holding portion 20 and is positioned and held by the coupling-element holding portion 20 by having an end surface 12a and the outer periphery 12b of the cylindrical portion 12 in abutment with the walls of the coupling-element holding portion 20.

Figure 2:
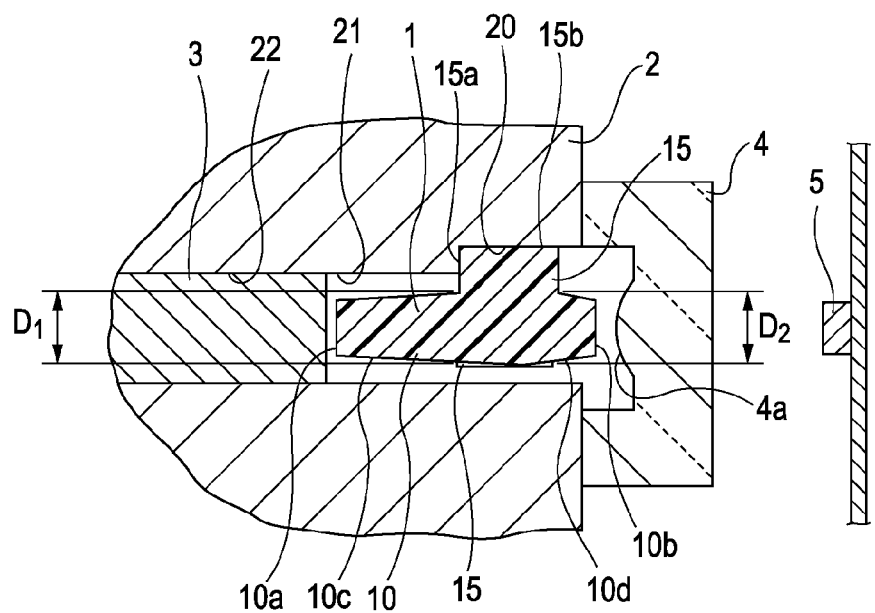
FIG. 2 is a cross-sectional view of an optical coupling unit according to a second embodiment.

In addition to the above description of the first embodiment of the present invention, a second embodiment of the present invention will be described below. FIG. 2 is a cross-sectional view of an optical coupling unit according to the second embodiment. The configuration of the second embodiment is substantially similar to that of the first embodiment in that the optical coupling element 1 is held by the holding member 2, the optical fiber 3 is disposed adjacent to one end of the optical coupling portion 10 of the optical coupling element 1, and the light emitting/receiving portion 5 is disposed facing the other end of the optical coupling element 1 across the lens member 4.

Figure 3:
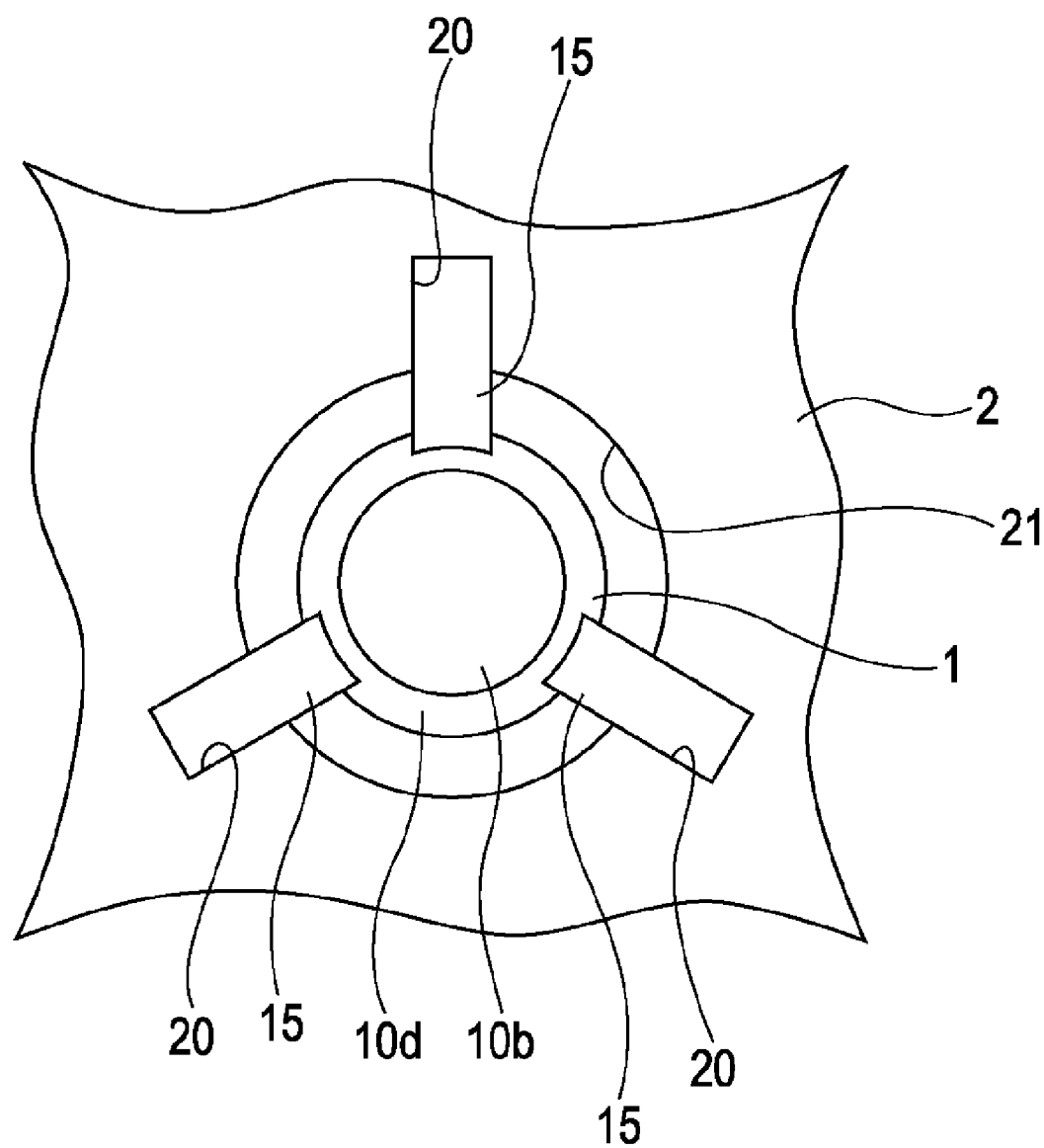
FIG. 3 is a front view of the optical coupling unit according to the second embodiment.

Although the optical coupling element 1 in the second embodiment is similar to that in the first embodiment in that it has the optical coupling portion 10 and the projection, the configuration of the projection in the second embodiment differs from that in the first embodiment. In the second embodiment, the projection projects in the form of fins from the periphery of the optical coupling portion 10. FIG. 3 is a front view of the optical coupling unit without the lens member 4. As shown in FIG. 3, three fins 15 project outward in the radial direction from the periphery of the optical coupling portion 10. On the other hand, the inner periphery surface of the holding member 2 has three grooves having a shape that substantially conforms to that of the fins 15. In this case, the three grooves serve as the coupling-element holding portion 20.

The optical coupling element 1 is inserted in the inner periphery surface of the holding member 2 while the fins 15 and the grooves serving as the coupling-element holding portion 20 are aligned with each other with respect to the circumferential direction. Then, the optical coupling element 1 is positioned and held by the holding member 2 by having end surfaces 15a and outer edges 15b of the fins 15 in abutment with the walls of the coupling-element holding portion 20. In this state, the periphery surfaces 10c and 10d of the optical coupling portion 10 are disposed facing the inner wall 21 of the holding member 2 while being spaced apart from the inner wall 21. This implies that the optical coupling portion 10 and the holding member 2 have an air gap therebetween that allows for light propagation between the optical fiber 3 and the light emitting/receiving portion 5.

As in the first embodiment, with respect to a center position between the end surfaces 10a and 10b of the optical coupling element 1, the fins 15 serving as the projection in the second embodiment are formed so as to be located at a position closer towards the end surface 10b. In addition, the periphery surfaces 10c and 10d of the optical coupling portion 10 are tapered respectively towards the end surfaces 10a and 10b. Moreover, the diameter $D_1$ of the periphery surface 10c of the optical coupling portion 10 at the position of the end surfaces of the fins 15 facing the optical fiber 3 is equal to or substantially equal to the diameter $D_2$ of the periphery surface 10d of the optical coupling portion 10 at the position of the end surfaces of the fins 15 facing the light emitting/receiving portion 5. Consequently, the amount of loss of light passing through the optical coupling portion 10 can be minimized even if the optical coupling portion 10 has the fins 15, and the optical coupling element 1 can have good mold release properties when undergoing a molding process.

Although the above embodiments of the present invention have been described above, it is to be understood that the present invention is not limited to the above embodiments and may be applied in various ways within the scope of the technical idea of the invention. For example, although the projection in the above embodiments is located at a position closer towards the end surface 10b with respect to the center position between the end surfaces 10a and 10b of the optical coupling element 1, the projection may alternatively be located at a position closer towards the end surface 10a. Moreover, although the light emitting/receiving portion 5 is provided so as to face the optical fiber 3 in the above embodiments, an arbitrary optical element such as a light-receiving element or a light-emitting element may be provided in accordance with the required function.

What is claimed is:

1. An optical coupling element disposed between an optical fiber and an optical element that face each other, the optical coupling element optically coupling the optical fiber and the optical element, the optical coupling element comprising:
    a generally cylindrical optical coupling portion having a first end surface facing the optical fiber, a second end surface facing the optical element, and a generally cylindrical but tapered peripheral surface extending between the first and second end surfaces; and
    a projection projecting in a radial direction from the peripheral surface of the optical coupling portion, the projection being located off a center position between the first and second end surfaces, the projection having a first side surface on the optical fiber side and a second side surface on the optical element side,
    wherein a diameter of the optical coupling portion at a first position corresponding to the first side surface of the projection is substantially equal to a diameter of the optical coupling portion at a second position corresponding to the second side surface of the projection, and
    wherein the peripheral surface of the optical coupling portion includes:
        a first peripheral surface tapered from the first position towards the first end surface; and
        a second peripheral surface tapered from the second position towards the second end surface.

2. The optical coupling element according to claim 1, wherein the optical coupling portion and the projection are formed from a single resin material.

3. The optical coupling element according to claim 1, wherein the optical coupling portion is configured such that one of the first and second peripheral surfaces of the optical coupling portion have different lengths in an optical-axis direction, and wherein one of the first and second peripheral surfaces that is shorter than the other has an inclination angle greater than that of the other.

4. The optical coupling element according to claim 1, wherein the projection includes:

a flange portion having a brim-like shape that projects from and extends around the peripheral surface of the optical coupling portion, and a cylindrical portion that extends from an outer edge of the flange portion in a direction orthogonal to the radial direction and coaxially surrounds the optical coupling portion.

5. The optical coupling element according to claim 1, wherein the projection comprises a fin projecting from the peripheral surface of the optical coupling portion.

6. The optical coupling element according to claim 5, wherein the projection comprises a plurality of fins arranged along the periphery of the optical coupling portion in a circumferential direction thereof.

7. An optical coupling unit comprising:

the optical coupling element according to claim 4; and a holding member for securing the optical coupling element and the optical fiber, wherein the holding member has a coupling-element holding portion having an internal shape that substantially corresponds to an external shape of the cylindrical portion of the projection, and an inner wall having an inner peripheral surface that faces the peripheral surface of the optical coupling portion while being spaced apart from the peripheral surface of the optical coupling portion.

8. An optical coupling unit comprising:

the optical coupling element according to claim 5; and a holding member for securing the optical coupling element and the optical fiber, wherein the holding member has a groove for holding the fin, and an inner wall having an inner peripheral surface that faces the peripheral surface of the optical coupling portion while being spaced apart from the peripheral surface of the optical coupling portion.

9. An optical coupling unit comprising:

the optical coupling element according to claim 1;

a holding member for securing the optical coupling element and the optical fiber, the projection of the optical coupling element abutting the holding member; and a lens member having a lens portion, the lens member fixed to the holding member such that the lens portion is placed between the second end surface of the optical coupling portion and the optical element.

10. The optical coupling element according to claim 1, wherein an entire length of the projection in an optical-axis direction is shorter than a length of the optical coupling portion from the first end surface to the second end surface.

* * * * *